United States Patent [19]
Stolz

[11] 3,795,234
[45] Mar. 5, 1974

[54] MOTOR VEHICLE WITH FUEL HEATING SYSTEM INDEPENDENT OF ENGINE

[75] Inventor: Albert Stolz, Pfrondorf, Germany

[73] Assignee: Daimler-Benz AG., Stuttgart, Germany

[22] Filed: June 23, 1971

[21] Appl. No.: 157,391

[30] Foreign Application Priority Data
Sept. 29, 1970 Germany.............................. 2032018

[52] U.S. Cl...................... 123/142.5 R, 123/179 H
[51] Int. Cl............................................. F02n 17/04
[58] Field of Search................ 123/142.5 A, 179 H; 237/12.3 C, 12.3 B

[56] References Cited
UNITED STATES PATENTS

| | | |
|---|---|---|
| 3,131,864 | 5/1964 | Young........................ 123/142.5 R |
| 2,400,977 | 5/1946 | Clarkson...................... 123/142.5 R |
| 3,397,684 | 8/1968 | Scherenberg................ 123/142.5 R |
| 2,858,823 | 11/1958 | Kelley.......................... 123/142.5 R |
| 2,508,277 | 5/1950 | Leslie............................ 123/142.5 R |
| 3,158,192 | 11/1964 | Mizer............................ 123/142.5 R |

Primary Examiner—Laurence M. Goodridge
Assistant Examiner—Cort R. Flint
Attorney, Agent, or Firm—Craig and Antonelli

[57] ABSTRACT

A motor vehicle with a water-cooled engine and an engine-independent fuel heater which is connected with the water circulation and the electrical power supply of the vehicle; the fuel heater includes two water circulations connected with the engine and in communication with each other, whereby the fuel heater equipped with a pump is arranged in one circulation and the heat-exchanger which is adapted to be connected or disconnected by means of a feeler, is arranged in the other circulation.

16 Claims, 3 Drawing Figures

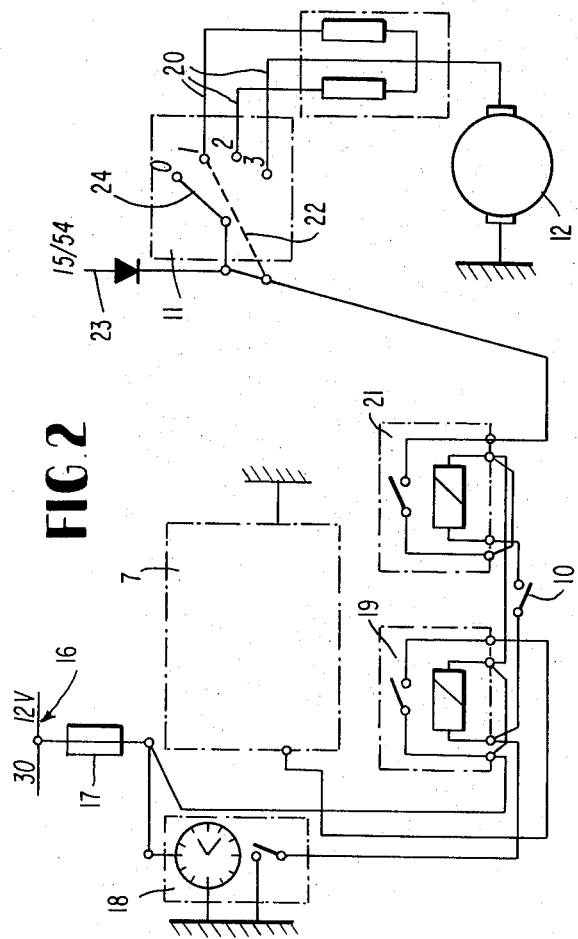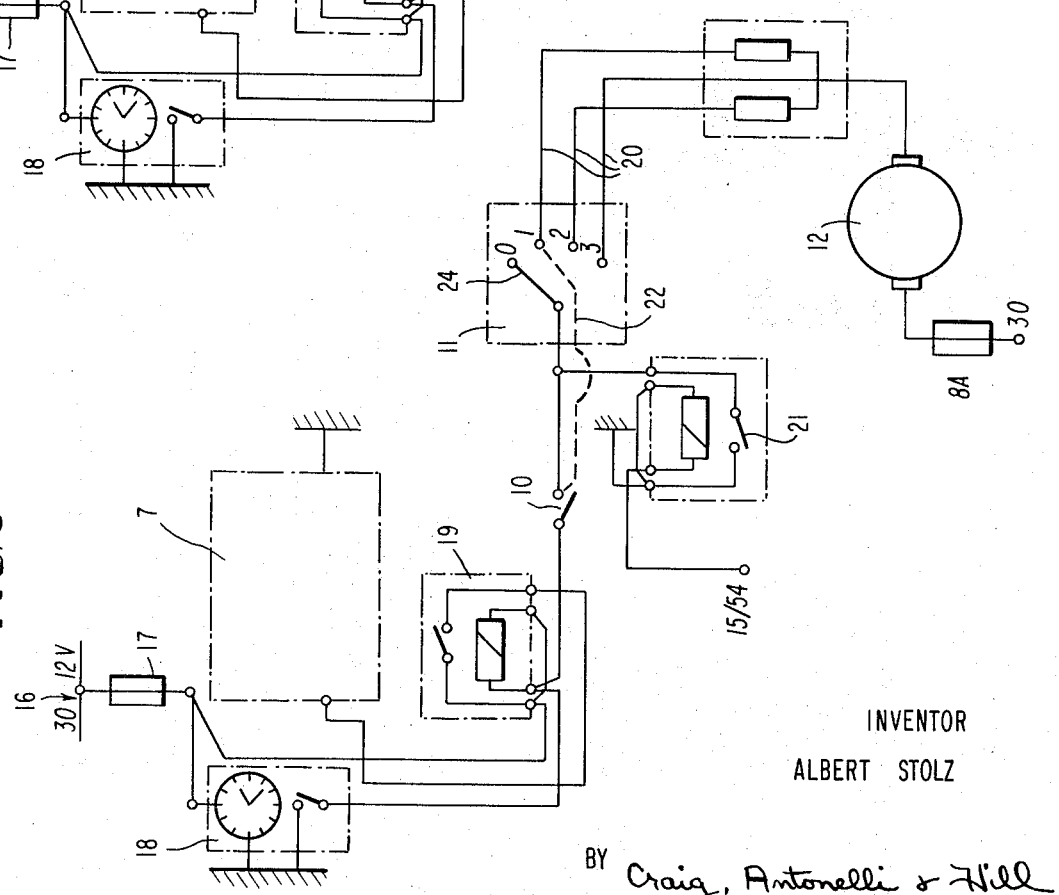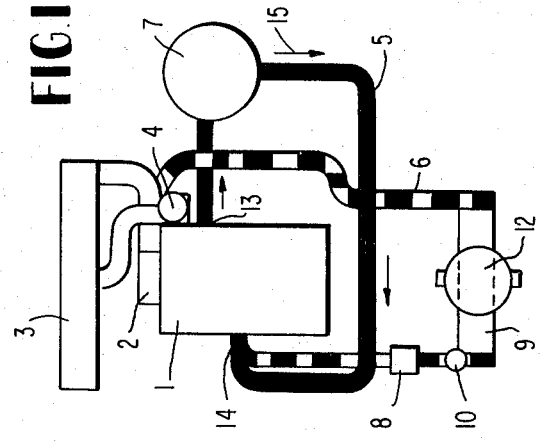

MOTOR VEHICLE WITH FUEL HEATING SYSTEM INDEPENDENT OF ENGINE

The present invention relates to a motor vehicle, especially to a passenger motor vehicle with a water-cooled engine and with a fuel heater independent of the engine, which is connected with the water circulatory system and with the electrical power supply of the motor vehicle.

The purpose of a fuel heater system resides in its use, as additional heating system in addition to the generally utilized engine heating system whereby it is independent from the operation of the engine. Fuel heating systems are known which can be installed subsequently as closed aggregate into a motor vehicle and which serve predominantly during winter operation of the vehicle for the heating of the engine and of the vehicle interior space before the engine itself is put into operation. However, it has proved disadvantageous that the subsequent installation of an engine-independent fuel heater is connected with considerable expenditures as regards assembly whereby it is further aggravating that frequently the necessary space for the appropriate installation of the fuel heater aggregate or unit is not present and the constructive design and layout of the heat-water circulation and of the power supply and electrical wiring of the motor vehicle is not suitable for the connection of an engine-independent fuel-heating system so that possibly overloads may occur which adversely affect the operation, i.e., which may cause operating troubles and breakdowns.

The present invention is concerned with the task to avoid these disadvantages and to ensure in a vehicle equipped with a fuel-heating system independent of the engine, an operationally reliable connection of the fuel-heating system with the water circulation and the electrical power supply of the vehicle, which is simple from an assembly point of view, by means of which a more versatile usability of the fuel heater becomes possible.

The underlying problems are solved according to the present invention in that two water circulatory systems connected with the engine and in communication with each other are provided and in that the fuel heater adapted to be selectively turned on and off and equipped with a pump is arranged in one water circulation and in that a heat-exchanger with a blower adapted to be turned on and off and controlled by a sensing device and a blower switch is arranged in the other circulation which is adapted to be disconnected.

It is advantageously possible by this layout and design of the heating system according to the present invention to utilize the fuel-heater system independently of the operation of the engine only for the heating of the engine itself or for the heating of the engine and the vehicle interior space or finally only as auxiliary heater during the operation of the vehicle.

According to a further advantageous feature of the present invention, preferably the suction flange of the water pump of the fuel heater may be connected to the engine block and the pressure flange, preferably constructed as connecting element of the two water circulations, may be connected to the cylinder head of the engine. However, the pressure flange may also be mounted between inlet heat-exchanger and cylinder head (with vehicles without water cock) and between water cock and cylinder head. However, it is appropriate in every case to select the connecting places in such a manner that only a slight pressure difference exists between the connecting places of the two water circulations with the engine so that with a turned-off fuel-heater system only slight amounts of water flow through the connecting lines and therefore with a turned-off auxiliary heating system, little heat is lost in the line systems disposed outside of the passenger space. The present difference is, as such, necessary in order to be able to vent the water circulation through the gasoline heater without having to turn on the gasoline heater. The flow velocity on the inside of the line system is dependent on the engine rotational speed with a turned-off fuel heater and therewith dependent on the rotational speed of the water pump.

In a further advantageous construction of the present invention, the pressure flange may be constructed preferably as a connecting section of the two water circulations and a water cock serving for the turning on and turning off function may be arranged between the pressure flange and the heat-exchanger upstream of the feeler or sensing device. However, it is also feasible within the scope of the present invention that the connecting place is realized at another part of the two water circulations. By closing the water cock, the heating in the interior space of the vehicle can be turned off in a simple and meaningful manner whereas the operation of the fuel heating system remains unaffected otherwise.

In a particularly advantageous embodiment of the present invention, the engine-independent fuel-heating system can be controlled in that an electric timing clock connected to the battery is provided which controls a relay, for example, by way of ground, which relay is operatively connected with the engine-independent fuel heating system. The engine-independent fuel heater can be turned on by means of the timer in a simple manner at any desired instant and can be turned off again after a predetermined heating duration so that, for example, during winter operation, the engine and the interior space of the motor vehicle can be preheated without the presence of the driver.

It is very appropriate for the actuation of the blower adapted to be turned on and off, if the feeler or sensing device is arranged between the relay and the blower switch which is preferably provided with several switching steps adapted to be selectively engaged. The feeler may thereby be so constructed that it turns on the blower in dependence on the water temperature by means of the blower switch, preferably at a water temperature of above 0° C., especially at the engagement temperature of about 20° C.

According to a still further advantageous feature of the present invention, the blower may be connected to ground and may be energized by way of a second relay arranged between the feeler and the blower switch, when the contact of the feeler is closed, and may be energized by way of a further line having an interconnected diode and by way of the blower switch when the contact of the feeler is opened and the ignition is turned on. However, it is also possible that the blower is connected to the plus terminal of the battery and is connected directly with ground when the contact of the feeler is closed, and is connected with ground by way of a second relay arranged between the feeler and the blower switch when the contact of the feeler is interrupted and the ignition is turned on.

Accordingly, it is an object of the present invention to provide a motor vehicle with a fuel-heating system independent of the engine which avoids by simple means the aforementioned shortcomings and drawbacks encountered hereinabove.

Another object of the present invention resides in an engine-independent fuel heater which can be readily installed subsequently into existing vehicles without involving considerable difficulties as regards accommodation and connections.

A further object of the present invention resides in a motor vehicle with an engine-independent fuel-heating system of the type described above which is compact in construction, reliable in operation and offers great versatility in its use.

These and further objects, features and advantages of the present invention will become more apparent from the following description when taken in connection with the accompanying drawing which shows, for purposes of illustration only, two embodiments in accordance with the present invention, and wherein:

FIG. 1 is a schematic view of the connection, on the water side, of the fuel-heating system with the motor vehicle engine in accordance with the present invention.

FIG. 2 is a schematic electric control diagram for the connection of the aggregate of the present invention to the electrical power system with a blower connected to ground; and FIG. 3 is a schematic electrical control diagram of a modified embodiment for the connection of the aggregate of the present invention to the electrical power system with a fan connected to the plus terminal of the battery.

Referring now to the drawing wherein like reference numerals are used throughout the various views to designate like parts, and more particularly to FIG. 1, the water-connection of the fuel heater aggregate to the engine 1 of the motor vehicle is illustrated in this figure. Reference numeral 2 designates the water pump and reference numeral 3 the radiator of the water-cooled engine 1. The thermostat 4 is arranged between the cylinder head of the engine 1 and the radiator 3. Two water circulations 5 and 6 in communication with each other are provided at the engine 1. The fuel heater 7 adapted to be turned on and turned off and provided with a pump (not shown) of conventional construction is arranged in the circulation 5 whereas a heat-exchanger 9 with a fan or blower 12 adapted to be turned on and off and controlled by a feeler 10 of conventional construction and by a fan switch 11 (not illustrated in FIG. 1), is arranged in the other circulation 6 which is adapted to be closed by a conventional water cock 8. For the simple differentiation of the two water circulations 5 and 6, the water circulation 5 is indicated in full line and the water circulation 6 in dash line with an opened water cock 8. The suction flange 13 of the water pump of the fuel heater 7 is connected with the engine block of the engine 1 and the pressure flange 14 with the cylinder head of the engine 1 whereby the connecting places 13 and 14 are so chosen that only a slight pressure difference exists between the same when the heater 7 is turned off. The pressure flange 14 is constructed as connecting element or section of the two water circulations 5 and 6 and the water cock 8 is arranged between the pressure flange 14 and the heat-exchanger 9 upstream of the feeler or sensing device 10. The direction of flow of the water is schematically indicated by arrows 15.

During the operation of the engine-independent fuel heater 7, the pump of the fuel heater 7 sucks in the water out of the engine block of the engine 1 and with a closed water cock, pumps the water by way of the connecting line 5 back into the engine whereas, when the water cock 8 is opened, it pumps the water into the engine 1 and into the heat-exchanger 9. The feeler 10 turns on the blower 12 at a temperature, for example, of 20° C., water temperature whereby the engaging temperature is preferably so selected that it lies above 0° C.

An embodiment of the electrical connection of the aggregate to the electrical power supply of the vehicle is schematically illustrated in FIG. 2. An electric timer clock 18 is connected to the battery 16 by way of a fuse 17, the timer 18 controls a relay 19 that turns the engine-independent fuel heater 7 selectively on and off. The sensing device 10 which is connected between the relay 19 and the control relay 21 for the blower switch 11, for sake of simplicity is only illustrated as a simple switch. The drawing illustrates the feeler 10 in the open position. At a predetermined water temperature, for example, at an engaging temperature of 20° C., the feeler 10 closes and thereby establishes a connection from the relay 19 to the blower switch 11.

The blower switch 11 includes three switching steps 20. If the blower switch 11 is connected between the plus terminal of the battery and the blower 12, then the closed contact of the feeler 10 connects the ground with a further relay 21 which is connected between the feeler 10 and the blower switch 11 and closes the energizing circuit between the relay 19 and, for example, the first step of the blower switch 11 by way of the line 22 illustrated in dash lines. If the line 22 is not provided, then the blower switch 11 has to be engaged with one of the possible switch steps 20 in order that the blower 12 runs as soon as a water temperature above the engaging temperature is reached, and the contact of the feeler 10 establishes the ground connection. Below the engaging temperature of, for example, 20° C., and with a turned-on ignition, the blower switch 11 receives its energized current by way of a further line 23 with an interconnected diode 24. The diode 24 is interconnected in the alternative energizing circuit 23 to prevent a current feed-back to the line 23 when the contact of the feeler 10 is closed and the ignition is turned off.

FIG. 3 illustrates a further embodiment for the connection of the fuel-heater aggregate to the electrical power supply of the motor vehicle. For purposes of simplification, the same reference numerals are used in the Figure as in FIG. 2. The blower 12 is connected with ground by way of the blower switch 11. When the contact of the feeler 10 is closed, this blower switch 11 is directly connected with ground provided the timer contact is closed. When the contact of the feeler 10 is opened, i.e., when the engaging temperature has not yet been reached, the blower switch 11 is connected with ground by way of the relay 21 when the ignition is turned on. The line 24 (shown in full lines) indicates that the blower 12 is switched to the step 0 and is not in operation when the ignition is turned off and the contact of the feeler 10 is open. The same result is achieved if the ignition is turned on and feeler contact 10 is open provided the line 22 is omitted. The driver also has the possibility to select any other one of the three blower steps so that the blower operates at the preselected step if it is energized by way of the feeler or the ignition. If the timer 18 now turns on the engine-independent fuel heater 7 at a predetermined instant and a water temperature above the engaging temperature of the feeler 10, for example, above 20° C., is present, then the contact of the feeler 10 is closed and a connection is established by way of the line 22 illustrated in dash line and the blower 12 so that the blower is set into operation in effect at step 1 even through this blower switch 11 is at step 0. By shifting the connecting line 24 of the blower switch 11 to another one of the three steps, the driver may selectively control the blower speed of the blower 12 in any desired manner.

The various uses of the engine-independent fuel heater will be briefly indicated hereinafter. If only the engine is to be pre-heated, then the water cock 8 is closed. The timer clock 18 engages at a predetermined, preselected time and connects ground with the relay 19. The engine-independent fuel heater 7 is now energized and starts so that warm water is pumped through the engine 1. If the interior space and the engine are to be pre-heated, the the water cock 8 is opened, whereby warm water flows through the engine 1 as well as the heat-exchanger 9 by way of the feeler 10. At a water temperature of 20° C., constituting the engaging temperature, the feeler 10 closes its contact and connects the ground with the relay 21 (FIG. 2) or with the blower switch 11 (FIG. 3). The The relay 21 (FIG. 2) switches and the blower 12 now runs. If the engine-independent fuel heater 7 is to be utilized as auxiliary heater during the drive, then the water cock 8 is opened and warm water flows from the engine 1 and from the engine-independent fuel heater 7 by way of the feeler 10 through the heat-exchanger 9 back to the engine water pump 2. Finally, it is also feasible that one lets the engine-independent fuel heater 7 continue to run after a drive, for example, in a waiting taxi, or turns it on after the drive in order to be able to continue to heat the interior space or the interior space as well as the engine.

While I have shown and described only two embodiments in accordance with the present invention, it is understood that the same is not limited thereto but is susceptible of numerous changes and modifications as known to those skilled in the art. For example, if the fuel heater of the present invention is used in a motor vehicle equipped with an air-conditioning system, the heat-exchanger 9 of the engine-independent fuel heater 7 is installed in front of the radiator 3 into the space of the condenser. Thus, I do not wish to be limited to the details shown and described herein but intend to cover all such changes and modifications as are encompassed by the scope of the appended claims.

What is claimed:

1. A motor vehicle with a fluid-cooled engine and a heater means, independent of the engine, for heating the fluid which is connected to a fluid circulatory system and an electrical power system of the motor vehicle comprising:
   a first and second fluid circulation connected with the engine for circulating the fluid therethrough; means for selectively operating the heater means; a fluid pump provided with the heater means, connected in one of said first and second fluid circulation means; a suction flange on said fluid pump connected with the engine block; a pressure flange on said fluid pump connected with a cylinder head of the engine; means on said pressure flange for connecting said first fluid circulation means with said second fluid circulation means; a heat exchanger connected with the other of said fluid circulation means; a blower operatively connected with said heat exchanger; switch means for operating said blower; sensor means connected to said switch means for operating said blower; and means for selectively rendering the other of said fluid circulation means inoperative.

2. A motor vehicle according to claim 1 wherein said last mentioned means includes a closure valve means serving for the selective opening and closing of said other fluid circulation means arranged between the pressure flange and the heat-exchanger upstream of the sensor means.

3. A motor vehicle according to claim 2 including, electrical battery in the electrical power system of the vehicle, further comprising an electrical timer means connected with the battery, said timer means controlling a relay which selectively turns on and off the heater means.

4. A motor vehicle according to claim 3 wherein the sensor means is operatively connected between the relay means and the blower switch.

5. A motor vehicle according to claim 4 wherein, the blower switch means has several switching steps.

6. A motor vehicle according to claim 5 wherein the sensor means actuates the blower in dependence of the fluid temperature by said blower switch means at a predetermined fluid temperature.

7. A motor vehicle according to claim 6, wherein said predetermined fluid temperature is above 0° C.

8. A motor vehicle according to claim 6, wherein said predetermined fluid temperature is about 20° C.

9. A motor vehicle according to claim 6, characterized in that the blower is connected with ground and in that the sensor means includes a contact, said blower being energized, when the contact of the sensor means is closed, by way of a second relay operatively connected between the sensor means and the blower switch means, and said blower being energized with an open contact of the sensor means and with a turned-on ignition means, by way of a further line with an interconnected diode and by way of the blower switch means.

10. A motor vehicle according to claim 6, characterized in that the sensor means includes a contact, the blower being connected with the non-grounded battery terminal and with the ground, when the contact of the sensor means is closed, whereas in case of an open contact of the sensor means and with a turned-on ignition, the blower is connected with ground by way of a second relay operatively connected between the sensor means and the blower switch means.

11. A motor vehicle according to claim 1 wherein said last mentioned means includes valve means for selectively opening and closing said other fluid circulation means.

12. A motor vehicle according to claim 1 wherein said sensor means actuates said blower in dependance of the fluid temperature by said switch means at a predetermined temperature.

13. A motor vehicle according to claim 12 wherein said predetermined fluid temperature is above 0° C.

14. A motor vehicle according to claim 12 wherein said predetermined fluid temperature is about 20° C.

15. A motor vehicle, especially a passenger motor vehicle, with a water-cooled engine and a fuel-heater means independent of the engine which is connected to a water circulatory system and an electrical power system of the motor vehicle, including an electrical battery characterized in that two water circulation means operatively connected with the engine and in communication with each other are provided, the fuel heater means adapted to be selectively turned on and off and provided with a pump being connected in one of said two water circulation means, and a heat-exchanger means with a blower means adapted to be selectively turned on and off and controlled by a feeler means and a blower switch means being connected in the other of said water circulation means, and said other water circulation means being operable to be selectively rendered ineffectual, and an electrical timer means is connected with the battery, said timer means controlling a relay means which selectively turns on and off the fuel heater means, and the blower means is connected with ground and the feeler means includes a contact, said blower means being energized, when the contact of the feeler means is closed, by way of a second relay means operatively connected between the feeler means and the blower switch means, and said blower means being energized with an open contact of the feeler means and with a turned-on ignition means, by way of a further line with an interconnected diode and by way of the blower switch means.

16. A motor vehicle, especially a passenger motor vehicle, with a water-cooled engine and a fuel-heater means independent of the engine which is connected to a water circulatory system and an electrical power system of the motor vehicle including an electrical battery, characterized in that two water circulation means operatively connected with the engine and in communication with each other are provided, the fuel heater means adapted to be selectively turned on and off and provided with a pump being connected in one of said two water circulation means, and a heat-exchanger means with a blower means adapted to be selectively turned on and off and controlled by a feeler means and a blower switch means being connected in the other of said water circulation means, and said other water circulation means being operable to be selectively rendered ineffectual, and an electrical timer means is connected with the battery, said timer means controlling a relay means which selectively turns on and off the fuel heater means, and the feeler means includes a contact, the blower means being connected with the non-grounded battery terminal and with the ground, when the contact of the feeler means is closed, whereas in case of an open contact of the feeler means and with a turned-on ignition, the blower means is connected with ground by way of a second relay means operatively connected between the feeler means and the blower switch means.

* * * * *

UNITED STATES PATENT OFFICE
CERTIFICATE OF CORRECTION

Patent No. 3,795,234            Dated March 5, 1974

Inventor(s) Albert STOLZ

It is certified that error appears in the above-identified patent and that said Letters Patent are hereby corrected as shown below:

Filing date incorrect should read:

--June 28, 1971--

Signed and sealed this 10th day of September 1974.

(SEAL)
Attest:

McCOY M. GIBSON, JR.            C. MARSHALL DANN
Attesting Officer            Commissioner of Patents